Dec. 3, 1940.   E. L. LUNDE   2,223,423
TIRE PRESSURE WARNING DEVICE
Filed June 25, 1938

INVENTOR.
Edwin L. Lunde
BY Sam. J. Slotsky
ATTORNEY

Patented Dec. 3, 1940

2,223,423

UNITED STATES PATENT OFFICE 2,223,423

TIRE PRESSURE WARNING DEVICE

Edwin L. Lunde, Sioux City, Iowa

Application June 25, 1938, Serial No. 215,761

4 Claims. (Cl. 200—58)

My device relates to signalling arrangement usable with pneumatic tires.

An object of my invention is to provide a warning signal to flash when a tire is deflated beyond a certain limit.

A further object of my invention is to provide such an arrangement especially usable with dual tires.

A further object of my invention is to provide adjustable means associated with the device so that the device can be varied for desired pressures.

A further object of my invention is to provide a device of such character which does not necessarily involve constantly contacting mechanical parts but only maintains contact when a lower pressure is reached.

A further object of my invention is to provide an arrangement which can be adapted to standard vehicles such as heavy trucks and the like and which can be manufactured at a reasonable cost.

Figure 1:
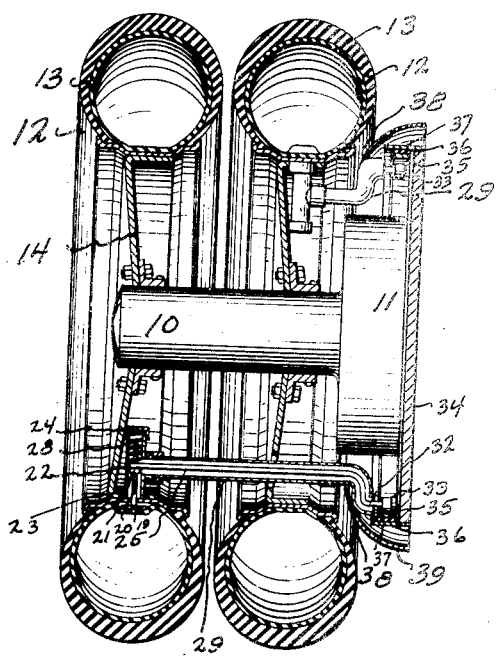
Figure 2:
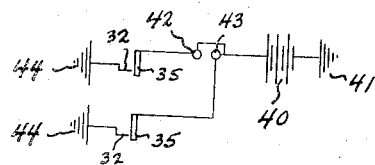
Figure 3:
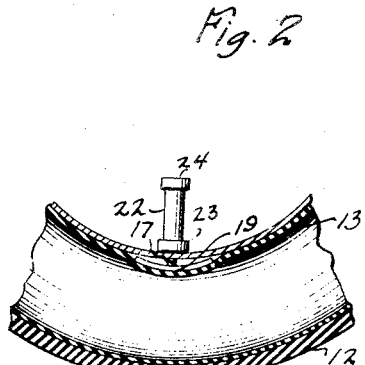
Figure 4:
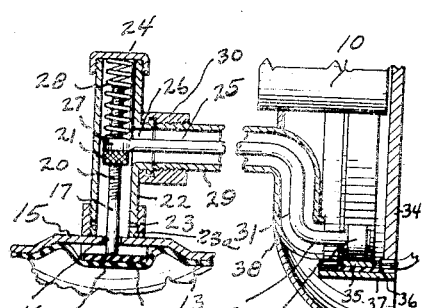

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a sectional view taken substantially through the axle of a dual tire arrangement, Figure 2 is a diagram showing the electrical structure, Figure 3 is a further detail, and Figure 4 is an enlarged detail of the contacting arrangement.

The principal difficulty encountered in dual tire arrangements is that when one of the tires becomes low through loss of air pressure injury is caused to the casing etc. through frictional rubbing and the like since the tire is correspondingly freer to move upon the rim and as a result such objectionable features are encountered. It is necessary for the driver to frequently get out of the car and to apply pressure against the casing to see if the tire is low.

The principal object of my invention is to eliminate such objectionable practices and to provide an automatic feature which will indicate readily whether the tire pressure has dropped to the danger point.

I have used the character 10 to designate generally the axle housing which receives the usual axle with the character 11 indicating the housing containing the brake bands etc. which need not be elaborated on herein since they do not enter into the invention. The dual casings are indicated by the characters 12 and the inner tubes by the character 13. Suitable discs or spokes 14 are shown in the usual manner which are connected to the axle housing. The rim 15 includes an opening 16 through which passes the stem 17. The stem 17 is attached at 18 to the rubber member 19 which bears against the inner tube 13. The stem 17 includes the threaded portion 20 upon which is screwed the nut 21. A housing member 22 is threadably engaged with the further coupling member 23, which coupling is attached to the fixed member 23a which is attached to the rim 15. Threadably engaged with the member 22 and at the top thereof is the cap 24. A lengthened rod 25 passes through an opening 26 in the side of the member 22 and includes the end portion 27 through which passes a continuation of the stem 20. Received between the cap 24 and the member 27 is the comparatively strong compression spring 28 which is maintained under pressure. It will be noted that the spring 28 receives the upper end of the stem 20. Enclosing the rod 25 is the pipe housing 29 which is attached to the member 22 by means of the coupling 30. The rod 25 extends into the downwardly bent portion 31 which again terminates in the forward horizontal portion 32 upon which is rotatably journalled the small roller 33.

The stationary disc portion of the vehicle which is attached rigidly thereto and which does not rotate is indicated by the character 34. A metal circular band 35 is attached to an insulating strip 36 which is attached to the portion 34. A further cylindrical band 37 is also attached to the portion 34. It will be noted that there are two such arrangements as shown in Figure 1, one of which passes to the outer casing and one of which passes to the inner casing, which in the latter respect is located oppositely to the lower and which involves the use of a shorter pipe housing 29. Attached at 38 to the upper and lower pipe housings is the arcuate shield 39 which serves to shield the mechanism therein against the entrance of dirt etc. and the ring member 36 also serves the same function so that as a result the entire arrangement is enclosed against adverse conditions such as weather etc.

The electrical connections are shown in Figure 2 wherein the character 40 shows the battery which is grounded at 41 and it will be noted that there are two electric bulbs, a left hand bulb 42 and a right hand bulb 43 for indicating corresponding deflations of the tire.

The contact rings 35 are shown in the circuit with the upper, for instance, representing the left hand side and the lower, the right hand side. The contact rod 32, of course, is grounded at 44 since all of the contacts are grounded through the mechanical arrangement. It will be noted that during normal operation and normal pressure conditions that the contact roller 33 will be maintained at a slight distance from the contact ring 35 since the pressure is forced against the spring 28. However, as soon as the pressure drops in the tube 13, the spring 28 will force the rod 25 downwardly thereby carrying the roller 33 against the ring 35 and establishing the contact to the grounded side which in turn causes the light 42 or 43 to glow indicating to the driver that the corresponding side is deflated.

The nut 21 allows permanent adjustment for any pressure since the same can be screwed upon the stem upwardly or downwardly to indicate corresponding pressures which automatically adjusts the spring for this purpose. This can be accomplished by unscrewing the member 22 from the coupling 23 and by use of a suitable tool or small rod the nut 21 can be adjusted. However, temporary adjustments can be made by means of the nut 24 which can be turned either to the left or right to adjust the tension of the spring 28, thereby effecting the necessary adjustment to the rod 25. The threads on the screw cap 24 can be made close fitting to maintain a tight and secure fit, and the spring 28 will also act as a lock to prevent the nut from turning. It will be particularly noted in my invention that there are no contact parts unless such is necessary, in other words, the entire arrangement is carried as a rigid structure while the wheel is turning and the contact is not established until the dangerous point is reached in deflation. It will also be noted that any of the parts can be removed easily when it is necessary to change the tires or the rim and it will be further noted from my invention that the parts are simple, will not get out of order, are weather and dust resisting etc., and involve a minimum of parts.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A tire pressure warning device comprising a stem received through a tire rim, a spring normally urging said stem outwardly against the tire pressure, means attachable to said stem to complete an electric circuit to indicate pressure drop in said tire, said means including an extended rod, a contact ring carried by the stationary portion of a vehicle and normally spaced from the termination of said rod, a contact roller rotatably journalled at the end of the rod, said contact ring being insulated from said portion, means for adjusting the indicating pressure including a nut threadedly engaged with said stem, said nut adapted to abut against said extended rod for adjusting tension against said spring.

2. A tire pressure warning device comprising a stem received through a tire rim, a spring normally urging said stem outwardly against the tire pressure, means attachable to said stem to complete an electric circuit to indicate pressure drop in said tire, said means including an extended rod, a contact ring carried by the stationary portion of a vehicle and normally spaced from the termination of said rod, a contact roller rotatably journalled at the end of the rod, said contact ring being insulated from said portion, means for adjusting the indicating pressure including a nut threadedly engaged with said stem, said nut adapted to abut against said extended rod for adjusting tension against said spring, a tubular housing including said stem, a further tubular protecting member attached to said housing for covering said extended rod.

3. A tire pressure warning device comprising a stem received through a tire rim, a spring normally urging said stem outwardly against the tire pressure, means attachable to said stem to complete an electric circuit to indicate pressure drop in said tire, said means including an extended rod, a contact ring carried by the stationary portion of a vehicle and normally spaced from the termination of said rod, a contact roller rotatably journalled at the end of the rod, said contact ring being insulated from said portion, means for adjusting the indicating pressure including a nut threadedly engaged with said stem, said nut adapted to abut against said extended rod for adjusting tension against said spring, a tubular housing including said stem, a further tubular protecting member attached to said housing for covering said extended rod, said warning device attached in opposed relation to alternate tires of a dual tire arrangement.

4. A tire pressure warning device comprising a stem received through a tire rim, a spring normally urging said stem outwardly against the tire pressure, means attachable to said stem to complete an electric circuit to indicate pressure drop in said tire, said means including an extended rod, a contact ring carried by the stationary portion of a vehicle and normally spaced from the termination of said rod, a contact roller rotatably journalled at the end of the rod, said contact ring being insulated from said portion, means for adjusting the indicating pressure including a nut threadedly engaged with said stem, said nut adapted to abut against said extended rod for adjusting tension against said spring, a tubular housing including said stem, a further tubular protecting member attached to said housing for covering said extended rod, said warning device attached in opposed relation to alternate tires of a dual tire arrangement, a protecting housing attached to said tubular rod inclosing members, said housing adapted to cover and inclose all said contacting arrangements.

EDWIN L. LUNDE.